United States Patent Office 3,047,972
Patented Aug. 7, 1962

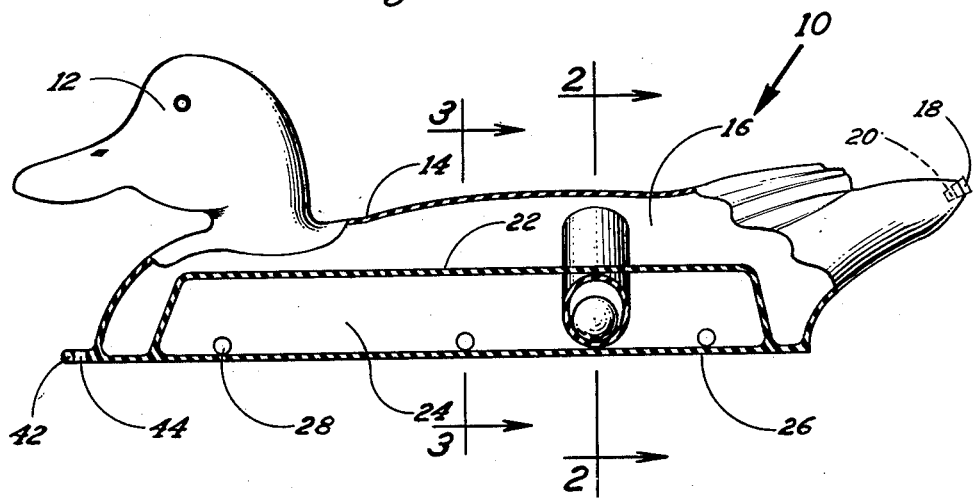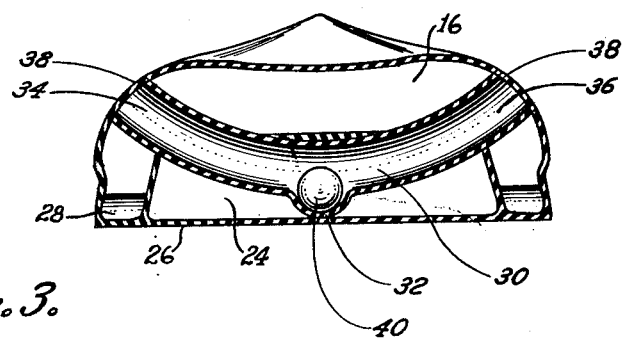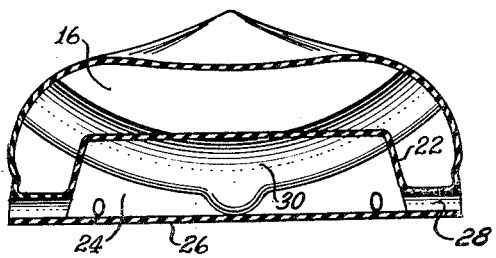

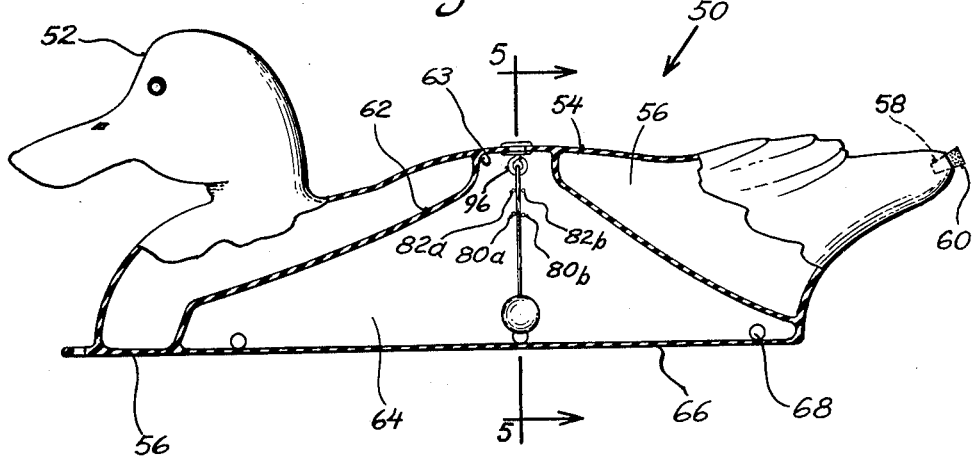
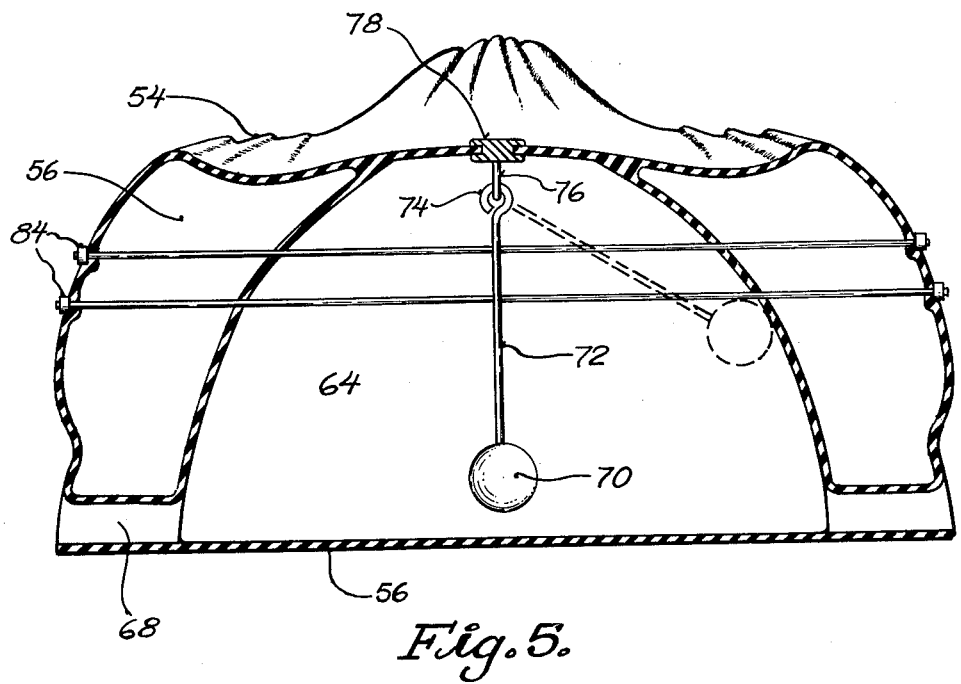

3,047,972
WATER-FOWL DECOY
Benjamin H. Taylor, 2120 W. 98th St.,
Bloomington 20, Minn.
Filed May 17, 1960, Ser. No. 30,710
7 Claims. (Cl. 43—3)

My invention relates to improvements in a water-fowl decoy. In general, the invention is concerned with a decoy that may be casually tossed into the water and provided with means to assure that the body will sit in the water in such a way as to simulate the appearance of a live water-fowl, and to assure that it cannot be capsized by wind or waves.

In the past, many efforts have been made to provide water-fowl decoys for use by hunters to attract live water-fowl. The prior efforts have included various forms of buoyant bodies, but those decoys have not been entirely satisfactory, because they can be readily capsized and will not return unaided to an upright position, and do not sit in the water in such a manner as to simulate live water-fowl. To prevent capsizing, efforts have been made to provide some form of a water chamber and, generally, that has consisted of a flexible body that is more or less open on the bottom and requires pinching or squeezing to drive out the air and permit induction of water by a partial vacuum. The difficulty with that form of decoy is that it must be carefully set in the water, and waves or wind frequently cause upsetting of the body to an extent that a substantial portion of the water is lost and the partial vacuum broken, which permits the decoy to capsize. Other efforts have included the use of an external pendulum, and in some cases, the pendulum is permitted to swing in longitudinal direction by the water movement to give the appearance of movement to the decoy. External pendulums often become entangled in weeds or securing lines and have, therefore, not been widely accepted.

This application is a continuation in part of application Ser. No. 540,883, filed October 17, 1955, now abandoned.

In the present invention, I provide a decoy composed of a buoyant body containing a substantially closed water chamber together with a plurality of small passages that extend from the outside of the body to the water chamber for the exit of air and influx of water, together with a movable weight that aids in upsetting the body for the induction of water, and as the water level increases within the body, the weight moves to a central position to aid in righting the body, where it may be held by a detent or the like in a neutral position to lower the center of gravity of the decoy body and thus tend to resist capsizing. Theoretically, the decoy could be made of numerous forms of material, but it is preferably composed of a flexible impervious material, such as latex or the like, so that if it is hit by stray shot, the punctures may be easily repaired.

An object of the invention is to provide a water-fowl decoy constructed so that it may be casually tossed into a body of water and regardless of the position it is in at the time it strikes the water, it will always assume an upright position and will sit in the water in a manner which simulates the appearance of a live water-fowl.

A further object is to provide a water-fowl decoy composed of a flexible impervious material containing an air chamber and a water chamber, together with small passages extending from the exterior of the body through the air chamber to the water chamber for the induction of water therein, and which are of a size to resist the ready loss of water on tipping, together with a movable weight contained within the body which aids in the induction of water and also aids in stabilizing the body against capsizing.

Other and further objects may become apparent from the following specification and claims, and in the appended drawings in which:

FIG. 1 is a side elevation, partially in section of the decoy forming the present invention;

FIG. 2 is a section taken on the line 2—2 of FIG. 1, looking in the direction of the arrows;

FIG. 3 is a section taken on the line 3—3 of FIG. 1;

FIG. 4 is a side elevation, partly in section, of another form of decoy embodying the present invention; and, FIG. 5 is a section taken on the line 5—5 of FIG. 4.

Referring now to the several figures of the drawing, the invention will be described in detail. General reference numeral 10 indicates one form of a buoyant decoy simulating the appearance of a duck, including a head portion 12 and a body portion 14. The head 12 and body 14 may be formed of any material necessary to give buoyancy to the body, but in a preferred form they are composed of a soft puncture-sealable latex material and are formed by molding the body 14 in such a manner as to form an air chamber 16 that may extend into the head 12. A vent 18 may be provided at any suitable place in the body, and as here disclosed is extending from the tail portion of the body. The vent 18 is provided for manufacturing convenience and to insure an air supply for the chamber 16 and is normally closed by a plug 20. Within the interior of body 14 is a wall 22 that is separated from the walls of body 14 and forms the upper limits of a water chamber 24 that is situated at the base of the air chamber 16, and when chamber 24 is filled with water lowers the center of gravity of the decoy. A lower layer of material 26 seals the bottom of water chamber 24 and also the bottom of the air chamber 16 so that the two chambers 16 and 24 are sealed with respect to each other. A plurality of narrow tubes 28 extend laterally through the air chamber 16 into the lower portion of water chamber 24 for communication between the water chamber 24 and the exterior of the body 14. As here disclosed, three such tubes 28 penetrate each side of the body and more or less tubes may be used if desired.

As disclosed in FIGS. 2 and 3, a curved tube 30 extends transversely within the interior of the body and is formed with a central recess or detent 32 at the lowermost point in the curvature. The tube 30 may be composed of any form of material, but it is within the conception of my invention to mold this tube of the same latex material as the remainder of the decoy so that it may be made coincident with the molding of other portions. In the original molding operation, the outer ends 34, 36 of tube 30 will be open, and are closed by plugs 38 after a spherical weight 40 composed of heavy metal has been inserted in the tube. The mobile weight 40 within tube 30 has a multiple function of shifting the center of gravity to permit entry of water into chamber 24 and thereafter coacting with the buoyancy of the body to aid in uprighting the decoy. Additionally, when the weight 40 is held by the detent 32, it further lowers the center of gravity and thus acts to further stabilize the decoy against capsizing. Thus, tube 30 and weight 40 in effect constitute an interior pendulum-like means with the plugs 38 forming the limits of lateral movement of the weight 40.

Often decoys of this type are used in conjunction with tie lines or anchoring means, and to secure the decoy, an abutment 42 extends from the front end beneath the head 12 and contains an opening 44 to receive the tie line.

As previously mentioned, the decoy can be composed of numerous forms of material and it is within the broadest concept of my invention that it may be made in any manner to provide a buoyant body, but as it is highly desirable that the decoy be light in weight and be capable of withstanding accidental shooting, it is of great advantage that it be composed of puncture-sealable material throughout except for weight 40, which will allow the hunter to roll up several decoys and carry them in his hunting coat.

The operation of the invention disclosed in FIGS. 1–3 will now be explained. Normally, the air chamber will contain air at atmospheric pressure in a sufficient amount to assure buoyancy of the decoy, and the plug 20 will be emplaced to insure that the chamber 16 is air-tight. The decoy is preferably casually cast into the water and this operation causes the weight 40 to be displaced from the detent 32 and in movement within the tube 30, but the invention will work equally well if the decoy is carefully placed on the water with the weight 40 in the detent 32, since the weight of the body will displace water above the openings of passages 28. When the decoy is placed upright in the water some of the air from chamber 24 will be displaced leaving some air in the chamber. In either event, and referring to a condition where the decoy would be on its side, the weight 40 will be at one extremity of tube 30 holding the decoy on its side so that air can be exhausted from the openings 28 on the upper side of the decoy, while water enters through the opposite row of openings 28 which are submerged. As the water level increases within the water chamber 24, it will tend to tip the decoy into an upright position, thereby causing the weight 40 to move in the direction of the detent 32, and when upright the detent operates to hold the weight in a central position at or adjacent the lowermost extremity of the decoy to further aid in stabilizing the decoy to resist lateral tipping. The combined weight of the body 10 and the sphere 40 are such that when the decoy is put in water at level keel, the disposition of the passages 28 is such that some water will enter the chamber 24, tending to stabilize the decoy. If, thereafter, the decoy is excessively tipped by wind or waves, the sphere 40 will be displaced from the detent 32 to further tilt the decoy so that the passages 28 on one side would be elevated above the water level to allow escape of air and also allow water to enter the chamber 24 through the passages on the opposite side until the mass of water in chamber 24 is sufficient to cause the decoy to be uprighted and whereby return the sphere 40 to its center position where it will again be held by the detent 32. Because the several walls of the body are preferably formed of flexible impervious material, if stray shots penetrate the body, the resilience of the material tends to close about the openings therein to minimize leakage, and the holes can be subsequently sealed by the application of uncured latex or other gummy plastic.

Referring now to FIGS. 4 and 5, general reference numeral 50 indicates another form of buoyant decoy that includes a head portion 52, and a body portion 54. The head 52 and the body 54 may be composed of a soft puncture-sealable latex material as in the instance of the decoy 10, or it may be composed of other suitable materials. The body 54, as illustrated, is formed with an interior air chamber 56 capable of giving buoyancy to the body. A vent 58 may be provided at any suitable place in the body and as here disclosed is extending from the tail portion of the body. The vent 58 is normally closed by a plug 60. Within the interior of body 54 is a wall 62 which is joined to the upper wall of the body at 63 for supporting purposes and also forms the outer limits of a water chamber 64. A lower layer of material 66 seals the bottom of the water chamber 64 and also the bottom of the air chamber 56 so that the two chambers 56 and 64 are sealed with respect to each other. A plurality of narrow tubes 68 extend laterally through the air chamber 56 into the lower portion of the water chamber 64 for communication between the water chamber 64 and the exterior of the body 54. The several passages 68 penetrate either side of the body as is visible in FIG. 5.

Within the interior of the water chamber 64 is a pendulum composed of a weight 70 secured to the lower end of a rod 72. The upper end of rod 72 is formed in a loop 74 and extends through an eye piece 76 of a fastening device 78 that penetrates the upper wall of the body 54. The pendulum is intended to move only in a lateral direction between suitable guide rods 80a, 80b, 82a and 82b. The rods 80a, 80b, 82a and 82b penetrate the walls of the water chamber and are secured to the outer wall 54 by suitable securing means 84.

The mode of operation of the decoy 50 is quite similar to that previously disclosed, except that the mobile weight disclosed is a true pendulum which is suspended from a fixed point and is adapted to swing under the influence of momentum and gravity. However, when the chamber 64 is substantially filled with water, the water in said chamber tends to impede the free swinging action of the pendulum.

It will be obvious to those skilled in the art that my invention may be modified my many substitutions and equivalents, and this disclosure is intended to be illustrative only. Therefore, I intend to be limited solely by the scope of the appended claims.

I claim:

1. A water-fowl decoy, comprising a buoyant body formed with an interior chamber in the lower portion thereof, which is closed on its lower extremity, said body being formed with at least one relatively narrow passage in each side of the body above the lower extremity forming communication between said chamber and the exterior of the body, said passages being adapted to admit water into one side of the chamber and permit the exhaustion of air from the opposite side when the body is laterally tilted in water, an arcuate tube which is closed at its opposite ends disposed within said body and extending transversely of the longitudinal center of said body, and a mobile weight carried within the interior of said tube which is adapted to move on one side of the longitudinal center of said body when the body is tilted in water to regulate the admission of water into said chamber, and to stabilize said body in water when said chamber is substantially filled with water.

2. A water-fowl decoy, comprising a buoyant body formed with an interior chamber in the lower portion thereof, which is closed on its lower extremity, said body being formed with at least one relatively narrow passage in each side of the body above the lower extremity forming communication between said chamber and the exterior of the body, said passages being adapted to admit water into one side of the chamber and permit the exhaustion of air from the opposite side when the body is laterally tilted in water, an arcuate tube which is closed at its opposite ends disposed within said body and extending transversely of the longitudinal center of said body with the opposite ends extending upwardly from the lower extremity of said body, said tube being formed with a depression at the longitudinal center of the body, and a mobile weight disposed within said tube and normally positioned within said depression but which is movable on either side of the longitudinal center of the body when said body is tilted, to regulate the admission of water into said chamber when the body is placed in a tilted position in water, and thereafter movable into said depression to stabilize said body in water when said chamber is substantially filled with water.

3. A water-fowl decoy, comprising a body composed of a layer of flexible impervious material forming a first chamber, a second layer of flexible impervious material disposed in the lower portion of the first chamber forming a second chamber that is sealed with respect to said first chamber, said body being formed with at least one passage in each side thereof extending into the second chamber adjacent its lower extremity, a spherical weight, and a curved tube enclosing said weight disposed within said body, said tube formed with a recess at its lowermost central portion to normally receive the weight and releasably hold said weight adjacent the lower extremity of the second chamber.

4. A water-fowl decoy, comprising a buoyant body formed with an interior chamber in the lower portion thereof, which is closed on its lower extremity and which occupies a substantial portion of the interior of said body, said body being formed with at least one relatively narrow passage in each side of the body above the lower extremity forming communication between said chamber and the exterior of the body, said passages being adapted to admit water into one side of the chamber and permit the exhaustion of air from the opposite side when the body is laterally tilted in water, and a pendulum carried within said body and disposed with the major portion of its mass below the center of the body when the latter is level and at rest to lower the center of gravity of said body in water, said pendulum being adapted for movement on either side of a center median of said body and in the direction of one of said passages when said body is tilted to regulate the admission of water into said chamber to stabilize said body in water.

5. A water-fowl decoy, comprising a buoyant body formed with an interior chamber in the lower portion thereof which is closed on its lower extremity and which occupies a substantial portion of the interior of said body, said body being formed with at least one pair of relatively narrow passages disposed in opposite sides thereof above the lower extremity forming restrictive communication between said chamber and the exterior of said body, said passages being adapted to admit water into said chamber and permit exhaustion of air therefrom when the body is tilted in water, and a mobile weight carried within said body and disposed below the center of said body when the latter is level and at rest to lower the center of gravity of said body in water, said weight being adapted for movement on either side of a center median of said body and in the direction of one of said passages when said body is tilted to regulate the admission of water into said chamber to stabilize said body in water.

6. A water-fowl decoy, comprising a buoyant body formed with an interior chamber in the lower portion thereof, which is closed on its lower extremity and which occupies a substantial portion of the interior of said body, said body being formed with at least one pair of relatively narrow passages disposed in opposite sides thereof above the lower extremity forming restrictive communication between said chamber and the exterior of said body, said passages being adapted to admit water into said chamber and permit exhaustion of air therefrom when the body is tilted in water, a mobile weight within the interior of said body, and means within said body restricting the movement of said weight to a plane generally parallel with said opposing passages and permitting said weight to move on either side of a center median of said body when the latter is tilted to regulate the admission of water into said chamber, said weight disposed below the center of said body when the latter is at rest and level to thereby lower the center of gravity of said body in water.

7. A water-fowl decoy, comprising a buoyant body formed with an interior chamber in the lower portion thereof, which is closed on its lower extremity and which occupies a substantial portion of the interior of said body, said body being formed with at least one pair of relatively narrow passages disposed in opposite sides thereof above the lower extremity forming restrictive communication between said chamber and the exterior of said body, said passages being adapted to admit water into said chamber and permit exhaustion of air therefrom when the body is tilted in water, a pendulum carried within said body and disposed with the major portion of its mass below the center of the body when the latter is level and at rest to lower the center of gravity of said body in water, and means disposed within said body on each side of said pendulum for restricting the movement of said pendulum to a plane generally parallel with said passages, said pendulum being adapted for movement on either side of a center median of said body and in the direction of one of said passages when said body is tilted to regulate the admission of water into said chamber to stabilize said body in water.

References Cited in the file of this patent

UNITED STATES PATENTS

| | | |
|---|---|---|
| 1,469,613 | Bailey | Oct. 2, 1923 |
| 1,870,559 | Drake | Aug. 9, 1932 |